(12) United States Patent
Takada et al.

(10) Patent No.: US 10,585,224 B2
(45) Date of Patent: Mar. 10, 2020

(54) POLARIZING PLATE AND METHOD FOR PRODUCING SAME

(71) Applicant: NITTO DENKO CORPORATION, Ibaraki-shi, Osaka (JP)

(72) Inventors: Katsunori Takada, Ibaraki (JP); Kota Nakai, Ibaraki (JP); Naotaka Higuchi, Ibaraki (JP); Keisuke Kimura, Ibaraki (JP); Yoshitsugu Kitamura, Ibaraki (JP); Hiroki Kuramoto, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 129 days.

(21) Appl. No.: 15/565,462

(22) PCT Filed: Mar. 10, 2016

(86) PCT No.: PCT/JP2016/057494
§ 371 (c)(1),
(2) Date: Oct. 10, 2017

(87) PCT Pub. No.: WO2016/167059
PCT Pub. Date: Oct. 20, 2016

(65) Prior Publication Data
US 2018/0120488 A1    May 3, 2018

(30) Foreign Application Priority Data

Apr. 17, 2015 (JP) .................. 2015-085106
Nov. 20, 2015 (JP) .................. 2015-227539

(51) Int. Cl.
*G02B 5/30* (2006.01)
*G02F 1/1335* (2006.01)
*G02B 1/14* (2015.01)

(52) U.S. Cl.
CPC .......... *G02B 5/3025* (2013.01); *G02B 5/3033* (2013.01); *G02F 1/1335* (2013.01); *G02F 1/133528* (2013.01); *G02B 1/14* (2015.01)

(58) Field of Classification Search
CPC ...... G02B 5/30; G02B 5/3025; G02B 5/3033; G02B 5/3041; G02B 5/305; G02B 1/105; (Continued)

(56) References Cited

U.S. PATENT DOCUMENTS 8,817,373 B2    8/2014  Kobayashi et al.
2002/0015807 A1  2/2002  Sugino et al.
(Continued)

FOREIGN PATENT DOCUMENTS

CN      1334557 A      2/2002
CN    103308969 A      9/2013
(Continued)

OTHER PUBLICATIONS

Extended Search Report dated Dec. 3, 2018, issued in counterpart European Application No. 16779851.1 (7 pages).
(Continued)

*Primary Examiner* — Stephone B Allen
*Assistant Examiner* — Adam W Booher
(74) *Attorney, Agent, or Firm* — Westerman, Hattori, Daniels & Adrian, LLP

(57) ABSTRACT

There is provided a polarizing plate excellent in durability. A polarizing plate 100 according to one embodiment of the present invention includes a polarizer 10; and a pair of protective films 21, 22 respectively arranged on both main surfaces of the polarizer 10, wherein the polarizing plate 100 has a polarizer void portion 30 formed by positioning of an end surface 10a of the polarizer 10 inward in a plane direction relative to each of end surfaces 21a, 22a of the protective films 21, 22.

12 Claims, 3 Drawing Sheets

(58) Field of Classification Search
CPC ... G02B 1/14; G02B 1/16; G02B 1/18; G02B 27/28; G02B 27/281; G02B 1/11; G02F 1/1335; G02F 1/133528
See application file for complete search history.

(56) References Cited

U.S. PATENT DOCUMENTS

| | | | |
|---|---|---|---|
| 2005/0260392 | A1 | 11/2005 | Sugino et al. |
| 2007/0097300 | A1* | 5/2007 | Lee .................... C08L 1/12 349/117 |
| 2007/0269616 | A1 | 11/2007 | Nakano et al. |
| 2008/0310020 | A1* | 12/2008 | Hashimoto ........ B29D 11/0073 359/485.01 |
| 2011/0019274 | A1 | 1/2011 | Kobayashi et al. |
| 2011/0211154 | A1* | 9/2011 | Aoyama ............. G02B 5/3033 351/49 |
| 2012/0019746 | A1 | 1/2012 | Yamada |
| 2014/0022639 | A1* | 1/2014 | Yabuhara ............. G02B 1/116 359/488.01 |
| 2014/0065364 | A1* | 3/2014 | Kitagishi ................ C08J 7/047 428/141 |

FOREIGN PATENT DOCUMENTS

| | | |
|---|---|---|
| EP | 2 065 119 A1 | 6/2009 |
| EP | 2 672 298 A1 | 12/2013 |
| JP | 62-158423 U | 10/1987 |
| JP | 10-206633 A | 8/1998 |
| JP | 2006-88651 A | 4/2006 |
| JP | 2009-37228 A | 2/2009 |
| JP | 2010-243863 A | 10/2010 |
| JP | 2011-248192 A | 12/2011 |
| JP | 2013-186252 A | 9/2013 |
| JP | 5588893 B2 | 9/2014 |
| TW | I367353 B | 7/2012 |
| TW | 201337351 A | 9/2013 |
| WO | 2013/114612 A1 | 8/2013 |

OTHER PUBLICATIONS

International Search Report dated Jun. 7, 2016, issued in counterpart of International Application No. PCT/JP2016/057494 (2 pages).
Office Action dated Oct. 28 2019, issued in counterpart TW Application No. 105111701, with English translation (12 pages).
Office Action dated Aug. 27, 2019, issued in counterpart CN Application No. 201680016691.1. with English translation (11pages).
Office Action dated Jul. 9, 2019, issued in Japanese Patent Application No. 2015-227539, with English translation.

* cited by examiner

POLARIZING PLATE AND METHOD FOR PRODUCING SAME

TECHNICAL FIELD

The present invention relates to a polarizing plate and a method of producing the polarizing plate.

BACKGROUND ART

A polarizing plate has been used in an image display apparatus (e.g., a liquid crystal display apparatus) of a cellular phone, a notebook personal computer, or the like. In recent years, the use of the polarizing plate in, for example, a meter display portion of an automobile or a smart watch has been desired, and hence the formation of the polarizing plate into a shape except a rectangular shape and the formation of a through-hole in the polarizing plate have been desired. However, when any such form is adopted, a problem in terms of durability is liable to occur. For the purpose of improving the durability, for example, there has been proposed a polarizing plate having an outer peripheral end surface formed by melting an end surface and then solidifying the end surface (see Patent Literature 1). However, a further improvement in durability has been required.

CITATION LIST

Patent Literature

[PTL 1] JP 2009-37228 A

SUMMARY OF INVENTION

Technical Problem

The present invention has been made to solve the problem, and a primary object of the present invention is to provide a polarizing plate excellent in durability.

Solution to Problem

According to one aspect of the present invention, a polarizing plate is provided. The polarizing plate includes a polarizer; and a pair of protective films respectively arranged on both main surfaces of the polarizer, wherein the polarizing plate has a polarizer void portion formed by positioning of an end surface of the polarizer inward in a plane direction relative to each of end surfaces of the protective films.

In one embodiment of the invention, the polarizer void portion is formed in a region ranging from each of the end surfaces of the protective films to a position distant therefrom by 15 μm or more inward in the plane direction.

In one embodiment of the invention, the polarizer void portion is formed in an end portion in an absorption axis direction.

In one embodiment of the invention, the polarizing plate has formed therein a through-hole and the polarizer void portion is formed in a peripheral edge portion of the through-hole.

In one embodiment of the invention, the polarizer void portion is formed in an outer edge portion.

In one embodiment of the invention, the outer edge portion includes a site that forms a substantially V-shape that is convex inward in the plane direction.

According to another aspect of the present invention, a production method for the polarizing plate is provided. The production method includes a step of bringing a treatment liquid into contact with a laminate obtained by laminating a protective film on each of both main surfaces of a polarizer.

In one embodiment of the invention, the treatment liquid contains water.

In one embodiment of the invention, the treatment liquid has a liquid temperature of 50° C. or more.

In one embodiment of the invention, the production method further includes a step of forming the laminate into a desired shape through cutting and/or punching processing.

In one embodiment of the invention, the cutting and/or the punching processing is performed by laser light irradiation.

In one embodiment of the invention, the laser light comprises $CO_2$ laser light.

Advantageous Effects of Invention

According to the present invention, the polarizing plate extremely excellent in durability can be obtained by virtue of the presence of the polarizer void portion formed by the positioning of the end surface of the polarizer inward in the plane direction relative to each of the end surfaces of the protective films.

DESCRIPTION OF EMBODIMENTS

Embodiments of the present invention are described below. However, the present invention is not limited to these embodiments.

A. Polarizing Plate

Figure 1:
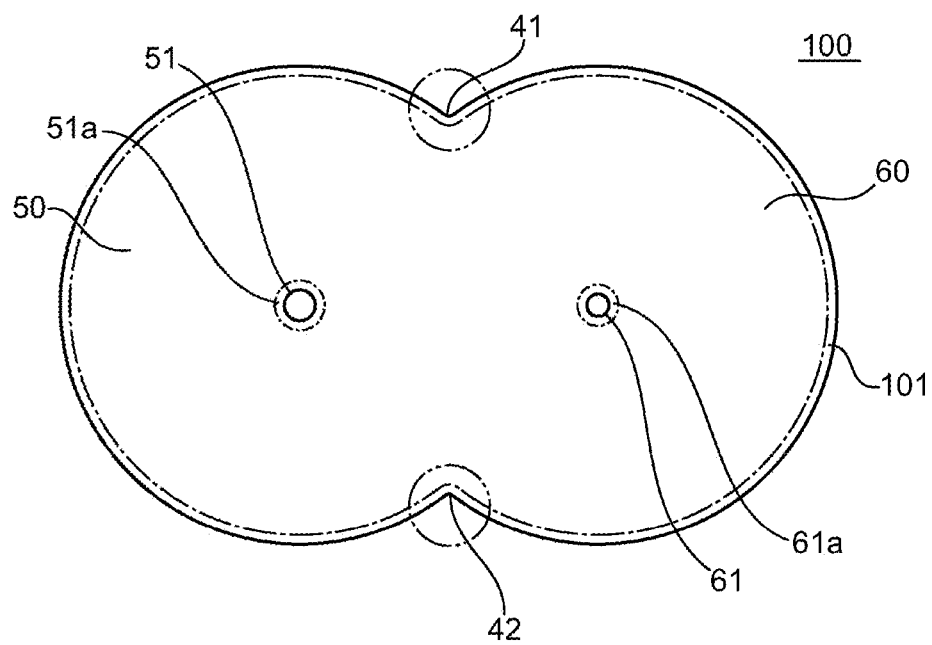
FIG. 1 is a plan view of a polarizing plate according to one embodiment of the present invention.
Figure 2:
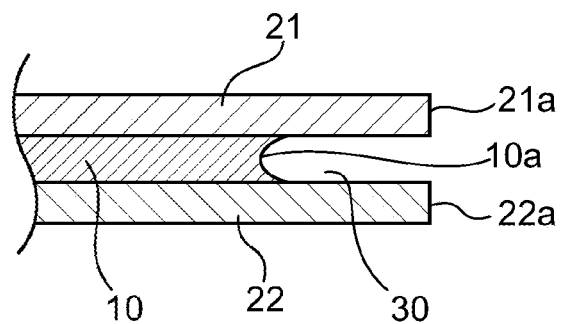
FIG. 2 is an enlarged sectional view of an end portion of the polarizing plate illustrated in FIG. 1.

FIG. 1 is a plan view of a polarizing plate according to one embodiment of the present invention, and FIG. 2 is an enlarged sectional view of an end portion of the polarizing plate illustrated in FIG. 1. A polarizing plate 100 is suitably used in the meter panel of an automobile. The polarizing plate 100 includes a first display portion 50 and a second display portion 60 that are continuously arranged, and through-holes 51 and 61 for fixing various meter needles are formed around the centers of the respective display portions. The diameter of each of the through-holes is, for example, from 0.5 mm to 100 mm. The outer edge of each of the display portions 50 and 60 is formed into an arc shape along the rotational direction of a meter needle.

The polarizing plate 100 includes a polarizer 10, and a pair of protective films 21 and 22 respectively arranged on both main surfaces of the polarizer 10. The polarizing plate 100 has a polarizer void portion 30, which is formed by the positioning of an end surface 10a of the polarizer 10 inward in a plane direction relative to each of end surfaces 21a and 22a of the protective films 21 and 22, at each of end portions thereof (specifically an outer edge portion 101 and peripheral edge portions 51a and 61a of the through-holes 51 and 61). When the polarizer void portion is formed, the durability of the polarizing plate can be improved. Specifically, the occurrence of a crack can be suppressed. In general, a polarizer has a shrinking force larger than that of a protective film, and hence a crack may occur owing to the occurrence of a stress in a boundary between the polarizer and the protective film due to changes in temperature and humidity. It is considered that when the polarizer void portion is formed, the stress can be relaxed. Therefore, when the polarizer void portion is formed in a site on which a stress is liable to concentrate, such as the peripheral edge of a through-hole or a site that forms a V-shape to be described later, the occurrence of the crack can be effectively suppressed. In addition, according to such mode, influences on the external appearance of the polarizing plate and its bonding to another member are extremely small.

When a through-hole is formed like the illustrated example, the position of the through-hole may be appropriately set in accordance with, for example, the applications of the polarizing plate. The crack is liable to occur from the peripheral edge of the through-hole serving as a starting point, and the tendency may be more remarkable as the position of the through-hole becomes more distant from the outer edge of the polarizing plate. As a result, as the position of the through-hole becomes more distant from the outer edge of the polarizing plate (e.g., its distance from the outer edge of the polarizing plate is 15 mm or more), the durability-improving effect exhibited by the formation of the polarizer void portion can be more significantly obtained.

In the outer edge portion 101, the polarizer void portion is preferably formed in at least a boundary portion 41 or 42 between the respective display portions. Specifically, the polarizer void portion is preferably formed in a site whose outer edge forms a V-shape (including an R-shape) that is convex inward in the plane direction. This is because the site whose outer edge forms a V-shape that is convex inward in the plane direction is liable to serve as the starting point of the crack as in the peripheral edge of the through-hole.

The polarizer void portion is preferably formed in an end portion in the absorption axis direction of the polarizer. The crack tends to occur along the absorption axis direction of the polarizer, and hence the formation of the polarizer void portion in the end portion in the absorption axis direction can effectively suppress the occurrence of the crack.

The polarizer void portion is preferably formed in a region ranging from each of the end surfaces of the protective films to a position distant therefrom by 15 μm or more inward in the plane direction, and is more preferably formed in a region ranging to a position distant therefrom by 20 μm or more. When the polarizer void portion is formed within such range, the durability-improving effect can be sufficiently obtained. Meanwhile, the polarizer void portion is preferably formed in a region ranging from each of the end surfaces of the protective films to a position distant therefrom by 1,000 μm or less inward in the plane direction, and is more preferably formed in a region ranging to a position distant therefrom by 500 μm or less, still more preferably 300 μm or less. According to a method of forming the polarizer void portion to be described later, the polarizer void portion is more easily formed in the end portion in the absorption axis direction of the polarizer than in any other direction (e.g., its transmission axis direction).

The polarizing plate of the present invention is not limited to the construction of the illustrated example, and may be appropriately changed. For example, the shape of the polarizing plate, the presence or absence of the through-holes, the shapes and sizes of the through-holes, and the number and formation positions of the through-holes may be appropriately changed.

A-1. Polarizer

The polarizer typically includes a resin film containing a dichromatic substance. Examples of the dichromatic substance include iodine and an organic dye. Those substances may be used alone or in combination thereof. Of those, iodine is preferably used.

Any appropriate resin may be used as a resin for forming the resin film. A hydrophilic resin (e.g., a polyvinyl alcohol (PVA)-based resin) is preferably used as the resin. Examples of the PVA-based resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically from 85 mol % to 100 mol %, preferably 95.0 mol % or more, more preferably 99.0 mol % or more, particularly preferably 99.93 mol % or more. The saponification degree may be determined in conformity with JIS K 6726-1994. The use of the PVA-based resin having such saponification degree can provide a polarizer excellent in durability.

The average polymerization degree of the PVA-based resin may be appropriately selected depending on purposes. The average polymerization degree is typically from 1,000 to 10,000, preferably from 1, 200 to 6,000, more preferably from 2,000 to 5,000. The average polymerization degree may be determined in conformity with JIS K 6726-1994.

The polarizer preferably shows absorption dichroism in the wavelength range of from 380 nm to 780 nm. The single axis transmittance (Ts) of the polarizer is preferably 40% or more, more preferably 41% or more, still more preferably 42% or more, particularly preferably 43% or more. A theoretical upper limit for the single axis transmittance is 50%, and a practical upper limit therefor is 46%. In addition, the single axis transmittance (Ts) is a Y value measured with the two-degree field of view (C light source) of JIS Z 8701 and subjected to visibility correction, and may be measured with, for example, a spectrophotometer (manufactured by JASCO Corporation, V7100). The polarization degree of the polarizer is preferably 99.8% or more, more preferably 99.9% or more, still more preferably 99.95% or more.

The thickness of the polarizer may be set to any appropriate value. The thickness is typically from 1 μm to 80 μm, preferably from 3 μm to 40 μm.

The polarizer may be typically obtained by subjecting the resin film to treatments, such as a swelling treatment, a stretching treatment, a dyeing treatment with the dichromatic substance, a cross-linking treatment, a washing treatment, and a drying treatment. The number of times of each of the treatments, the order in which the treatments are performed, the timings of the treatments, and the like may be appropriately set. When the resin film is subjected to each of the treatments, the film may be a resin layer formed on a substrate.

The cross-linking treatment is performed by, for example, bringing a boric acid solution (e.g., an aqueous solution of boric acid) into contact with the resin film. In addition, when a wet stretching system is adopted in the stretching treatment, the stretching is preferably performed while a boric acid solution is brought into contact with the resin film. A stretching direction in the stretching treatment may correspond to the absorption axis direction of the polarizer to be obtained. In ordinary cases, the resin film is uniaxially stretched at from 3 times to 7 times from the viewpoint that excellent polarization characteristics are obtained.

In one embodiment, the polarizer has a low-concentration portion, in which the concentration of a component contained in the resin film is lower than that in any other site, formed adjacent to the polarizer void portion (in an end portion in the plane direction of the resin film). Examples of the component contained in the resin film include boric acid, the dichromatic substance, and components contained in solutions to be used for the above-mentioned various treatments (e.g., a solution having dissolved therein an iodide, such as potassium iodide). When the low-concentration portion is formed, the durability can be further improved. Specifically, in the low-concentration portion, for example, across-linked structure formed by the component (typically boric acid) is removed, and hence the low-concentration portion can have rigidity lower than that of any other site. As a result, in the low-concentration portion, a stress due to the shrinkage of the polarizer is relaxed, and hence the occurrence of a crack can be suppressed.

As described above, the rigidity of the low-concentration portion of boric acid may be made lower than that of the other portion by the removal of the cross-linked structure based on boric acid. Accordingly, while the occurrence of the crack is suppressed, the heat resistance may reduce. One possible cause for the foregoing is that in the low-concentration portion of boric acid, the content of an iodine complex (e.g., $I_3^-$ or $I_5^-$) is low and the content of an iodine ion (e.g., $I^-$ or $I_3^-$) is high. While the iodine complex may be aligned in the resin film, the iodine ion may be present in an instable state in the resin film. Accordingly, when a substance capable of forming a counterion for iodine (e.g., potassium and/or sodium) is introduced into the low-concentration portion of boric acid, the iodine ion can be stabilized to improve the heat resistance of the resin film (e.g., polyene formation can be suppressed to suppress the coloring of the resin film). As a specific embodiment, for example, there is given a mode in which a high-concentration portion, which contains a higher concentration of the substance capable of forming a counterion for iodine than that in any other site, is formed in the resin film in correspondence to the low-concentration portion of boric acid.

A-2. Protective Film

As formation materials for the protective film, there are given, for example, a cellulose-based resin, such as diacetyl cellulose or triacetyl cellulose (TAC), a (meth)acrylic resin, a cycloolefin-based resin, an olefin-based resin, such as polypropylene, an ester-based resin, such as a polyethylene terephthalate-based resin, a polyamide-based resin, a polycarbonate-based resin, and copolymer resins thereof. The term "(meth)acrylic resin" refers to an acrylic resin and/or a methacrylic resin.

The thickness of the protective film is preferably from 10 μm to 200 μm. A surface-treated layer may be formed on one side of the protective film (side on which the polarizer is not arranged). Specifically, the side may be subjected to a hard coat treatment, an antireflection treatment, or a treatment intended for diffusion or anti-glaring. The constructions (including a formation material and a thickness) of the pair of protective films may be identical to each other, or may be different from each other.

The protective film is typically laminated on the surface of the polarizer through intermediation of an adhesive layer. Any appropriate adhesive may be used as an adhesive. For example, an aqueous adhesive, a solvent-based adhesive, or an active energy ray-curable adhesive is used. An adhesive containing a PVA-based resin is preferably used as the aqueous adhesive.

B. Production Method for Polarizing Plate

In one embodiment, the polarizing plate is produced by: forming a laminate obtained by laminating a protective film on each of both main surfaces of a polarizer into a desired shape by cutting and/or punching; and then forming the polarizer void portion.

B-1. Cutting (Punching)

Any appropriate method may be adopted as a cutting (punching) method. For example, a method involving using a cutting blade (punching die), such as a Thomson blade or a pinnacle blade, or a method involving irradiating the laminate with laser light, is given. Cutting by laser light irradiation is preferably adopted. The laser light irradiation provides a smooth cut surface and can suppress the occurrence of the starting point of a crack (initial crack).

Any appropriate laser may be adopted as the laser as long as the laminate (polarizing plate) can be cut. A laser that can emit light having a wavelength in the range of from 150 nm to 11 μm is preferably used. Specific examples thereof include a gas laser, such as a $CO_2$ laser, a solid laser, such as a YAG laser, and a semiconductor laser. Of those, a $CO_2$ laser is preferably used.

A condition for the laser light irradiation may be set to any appropriate condition depending on, for example, the laser to be used. When the $CO_2$ laser is used, an output condition is preferably from 10 W to 1,000 W, more preferably from 100 W to 400 W.

B-2. Formation of Polarizer Void Portion

The polarizer void portion is formed by, for example, bringing a treatment liquid into contact with the laminate. According to such mode, the polarizer void portion can be easily formed in a desired site. Specifically, the polarizer void portion can be satisfactorily formed through the elution of constituent components of the polarizer (e.g., boric acid, the dichromatic substance, an iodine compound, and the resin film) into the treatment liquid, and/or through the shrinkage of the resin film inward in the plane direction. In addition, according to such mode, the low-concentration portion can be simultaneously formed. Any appropriate method may be adopted as a method of bringing the treatment method into contact with the laminate. Specific examples thereof include: a method involving immersing the laminate in the treatment liquid; a method involving applying the treatment liquid to the laminate; and a method involving spraying the laminate with the treatment liquid. Of those, a method involving immersing the laminate in the treatment liquid is preferably adopted.

For example, water, alcohols, such as methanol and ethanol, dimethyl sulfoxide, dimethylformamide, dimethylacetamide, N-methylpyrrolidone, various glycols, polyhydric alcohols, such as trimethylolpropane, and amines, such as ethylenediamine and diethylenetriamine are used for the treatment liquid. Those solvents may be used alone or in combination thereof. Of those, water is preferably used.

The treatment liquid may contain a substance capable of forming a counterion for iodine. In this case, the treatment liquid is typically a solution obtained by dissolving, in the solvent, a compound containing the substance capable of forming a counterion for iodine. When such treatment liquid is used, the high-concentration portion can be formed through the introduction of the substance capable of forming a counterion for iodine into the resin film simultaneously with the formation of the low-concentration portion.

It is preferred that potassium iodide and/or sodium chloride be used as the compound containing the substance capable of forming a counterion for iodine. The compounding amount of such compound is preferably from 0.1 part by weight to 10 parts by weight, more preferably from 1 part by weight to 5 parts by weight with respect to 100 parts by weight of the solvent.

In one embodiment, the treatment liquid is a basic solution. In this case, the treatment liquid may be obtained by compounding the solvent with a basic compound. Examples of the basic compound include: hydroxides of alkali metals, such as sodium hydroxide, potassium hydroxide, and lithium hydroxide; hydroxides of alkaline earth metals, such as calcium hydroxide; inorganic alkali metal salts, such as sodium carbonate; and organic alkali metal salts, such as sodium acetate. Those basic compounds may be used alone or in combination thereof. The concentration of the basic solution is, for example, from 1 N to 10 N.

In another embodiment, the treatment liquid is an acidic solution. In this case, the treatment liquid may be obtained by compounding the solvent with an acidic compound. Examples of the acidic compound include: inorganic acids, such as hydrochloric acid, sulfuric acid, nitric acid, and hydrogen fluoride; and organic acids, such as formic acid, oxalic acid, citric acid, acetic acid, and benzoic acid. Those acidic compounds may be used alone or in combination thereof. The concentration of the acidic solution is, for example, from 1 N to 10 N.

The treatment liquid may contain an additive.

The liquid temperature of the treatment liquid (at the time of the contact) is preferably 50° C. or more, more preferably 60° C. or more. This is because the polarizer void portion can be satisfactorily formed. Meanwhile, the liquid temperature of the treatment liquid (at the time of the contact) is preferably 90° C. or less. In a preferred embodiment, under a state in which the treatment liquid is brought into contact with the laminate, the treatment liquid is warmed so that the treatment liquid may have a predetermined temperature (the temperature of the treatment liquid may be maintained at the predetermined temperature). When the laminate is immersed in the treatment liquid, an immersion time is, for example, from 3 minutes to 20 minutes.

In one embodiment, when the treatment liquid is brought into contact with the laminate, the treatment liquid is subjected to an ultrasonic treatment. Specifically, the laminate is immersed in an ultrasonic bath. According to such mode, the polarizer void portion can be efficiently formed. The ultrasonic treatment may be performed under any appropriate conditions. An output is, for example, from 40 W to 1,000 W. A frequency is, for example, from 15 kHz to 100 kHz.

The laminate (polarizing plate) may be subjected to the drying treatment after its contact with the treatment liquid. A drying temperature is, for example, from 50° C. to 120° C.

EXAMPLES

Now, the present invention is specifically described by way of Examples. However, the present invention is not limited to these Examples.

Example 1

(Production of Polarizing Plate Sheet)

A film (thickness: 28 µm) obtained by incorporating iodine into an elongated PVA-based resin film and uniaxially stretching the film in its lengthwise direction (MD direction) was used as a polarizer.

A PVA-based adhesive was applied to one side of the polarizer so that its thickness after drying became 100 nm, and an elongated TAC film having a thickness of 40 µm was bonded to the polarizer so that their lengthwise directions were aligned with each other.

Subsequently, a PVA-based adhesive was applied to the other side of the polarizer so that its thickness after drying became 100 nm, and an elongated acrylic film having a thickness of 30 µm was bonded to the polarizer so that their lengthwise directions were aligned with each other.

Thus, a polarizing plate sheet having a construction "TAC film/polarizer/acrylic film" was obtained.

The resultant polarizing plate sheet was cut with a $CO_2$ laser (wavelength: 9.35 µm, output: 150 W) to provide a cut piece of a size measuring 54 mm by 54 mm, the cut piece having a through-hole having a diameter of 4 mm formed in a site distant from its outer edge by 25 mm.

The resultant cut piece was immersed in warm water kept at 74° C. for 16 minutes to provide a polarizing plate.

Example 2

A polarizing plate was obtained in the same manner as in Example 1 except that: the size of the cut piece was set to 94 mm by 94 mm; and the through-hole was formed in a site distant from the outer edge of the cut piece by 45 mm.

Example 3

A polarizing plate was obtained in the same manner as in Example 1 except that: the size of the cut piece was set to 114 mm by 114 mm; and the through-hole was formed in a site distant from the outer edge of the cut piece by 55 mm.

Comparative Example 1

A polarizing plate was obtained in the same manner as in Example 1 except that the cut piece was not immersed in warm water.

Comparative Example 2

A polarizing plate was obtained in the same manner as in Example 2 except that the cut piece was not immersed in warm water.

Comparative Example 3

A polarizing plate was obtained in the same manner as in Example 3 except that the cut piece was not immersed in warm water.

The resultant polarizing plates were subjected to the following evaluations.

1. Observation with Optical Microscope

A polarizing plate having an end portion embedded in a resin was cut in its thickness direction, and the cut surface was observed with an optical microscope (manufactured by Nikon Corporation, ECLIPSE LV100, magnification: 50).

2. Heat Cycle (HS) Test

A test sample was obtained by bonding the resultant polarizing plate to a glass plate with an acrylic pressure-sensitive adhesive (thickness: 20 km). The sample was left to stand under an environment at −40° C. for 30 minutes and then left to stand under an environment at 85° C. for 30 minutes. The foregoing operation was defined as one cycle and the cycle was repeated 100 times. After that, whether or not a crack occurred in the polarizing plate was observed.

Figure 3:
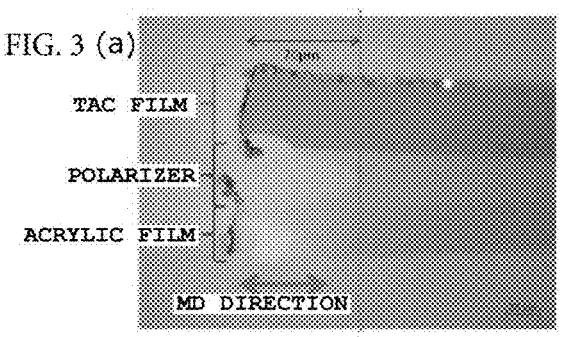
FIG. 3(a) is a photograph obtained by observing an end portion (MD direction) of a polarizing plate of Example 1 with an optical microscope.
FIG. 3(b) is a photograph obtained by observing an end portion (TD direction) of the polarizing plate of Example 1 with an optical microscope.
FIG. 3(c) is a photograph obtained by observing an end portion of a polarizing plate of Comparative Example 1 with an optical microscope.
Figure 3:
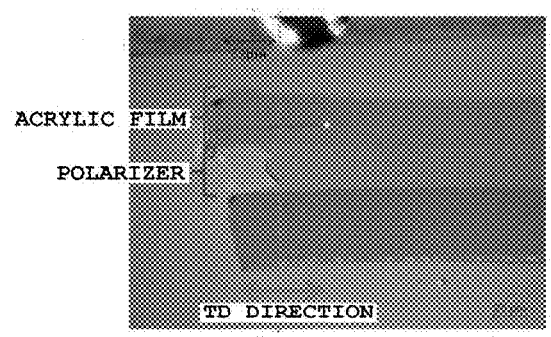
Figure 3:
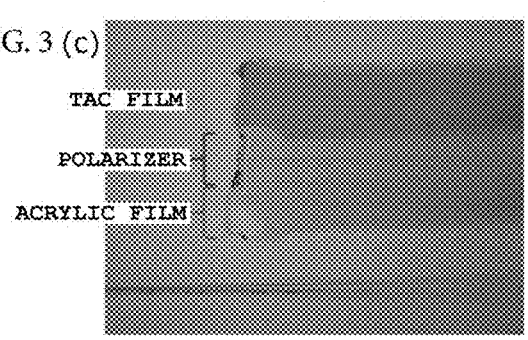

FIG. 3 are photographs obtained by observation with an optical microscope, FIG. 3(a) is a photograph for showing an end portion (MD direction) of the polarizing plate of Example 1, FIG. 3(b) is a photograph for showing an end portion (TD direction) of the polarizing plate of Example 1, and FIG. 3(c) is a photograph for showing an end portion of the polarizing plate of Comparative Example 1. It was found that a polarizer void portion was formed in each of the end portions of the polarizing plate of Example 1.

Comparing FIG. 3(a) and FIG. 3(b), it was found that the polarizer void portion was formed with a larger size in the end portion in the stretching direction (absorption axis direction) than in the end portion in the direction (TD direction) perpendicular to the stretching direction. In addition, it can be found from FIG. 3(a) that the thickness of the end portion of the polarizer is larger than the thickness of its central portion. Those findings suggest that the shrinkage of the polarizer contributes to the formation of the polarizer void portion.

Figure 4:
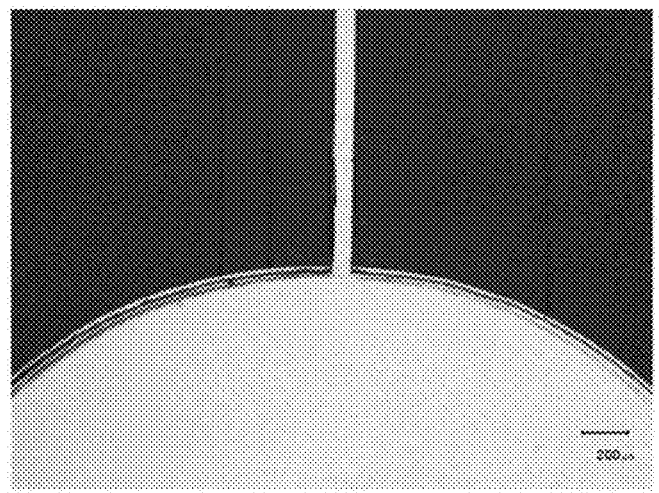
FIG. 4(a) is a photograph for showing the external appearance of a polarizing plate of Comparative Example 3 after a heat cycle test.
FIG. 4(b) is a photograph for showing the external appearance of a polarizing plate of Example 3 after a heat cycle test.
Figure 4:
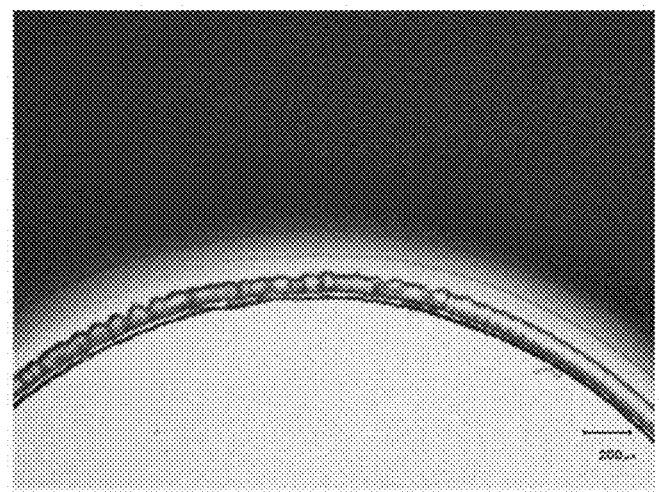

In the polarizing plate of each of Examples, the occurrence of a crack (including a small crack) was not observed after the HS test, whereas in the polarizing plate of each of Comparative Examples, a crack occurred along the stretching direction after the HS test, as shown in the photographs of FIG. 4 obtained by observation with an optical microscope (manufactured by Olympus Corporation, MX61, magnification: 5). In Comparative Example 1, a crack length was as small as 12 mm, but in each of Comparative Examples 2 and 3, the crack extended from the through-hole serving as a starting point to an end side of the polarizing plate.

INDUSTRIAL APPLICABILITY

The polarizing plate of the present invention can be suitably used not only in an image display apparatus (a liquid crystal display apparatus or an organic EL device) of a rectangular shape but also in, for example, an image display portion of a particular shape typified by the meter display portion of an automobile or a smart watch.

REFERENCE SIGNS LIST 10 polarizer
21, 22 protective film
30 polarizer void portion
100 polarizing plate

The invention claimed is:

1. A polarizing plate, comprising:
a polarizer; and
a pair of protective films respectively arranged on both main surfaces of the polarizer,
wherein the polarizing plate has a polarizer void portion formed by positioning of an end surface of the polarizer inward in a plane direction relative to each of end surfaces of the protective films, and
the polarizing plate has formed therein a through-hole and the polarizer void portion is formed in a peripheral edge portion of the through-hole.

2. The polarizing plate according to claim 1, wherein the polarizer void portion is formed in a region ranging from each of the end surfaces of the protective films to a position distant therefrom by 15 μm or more inward in the plane direction.

3. The polarizing plate according to claim 1, wherein the polarizer void portion is formed in an end portion in an absorption axis direction.

4. The polarizing plate according to claim 1, wherein the polarizer void portion is formed in an outer edge portion.

5. The polarizing plate according to claim 4, wherein the outer edge portion includes a site that forms a V-shape that is convex inward in the plane direction.

6. A production method for the polarizing plate of claim 1, comprising a step of bringing a treatment liquid into contact with a laminate obtained by laminating a protective film on each of both main surfaces of a polarizer.

7. The production method according to claim 6, wherein the treatment liquid contains water.

8. The production method according to claim 6, wherein the treatment liquid has a liquid temperature of 50° C. or more.

9. The production method according to claim 6, further comprising a step of forming the laminate into a desired shape through cutting and/or punching processing.

10. The production method according to claim 9, wherein the cutting and/or the punching processing is performed by laser light irradiation.

11. The production method according to claim 10, wherein the laser light comprises CO2 laser light.

12. The polarizing plate according to claim 1, wherein the protective film is formed of a resin.

* * * * *